United States Patent Office 3,551,194
Patented Dec. 29, 1970

3,551,194
POLYBUTENE-1-COMPOSITION AND METHOD OF PRINTING THEREON
Thomas Hugh Shepherd, Hopewell, and Walter Polovina, Princeton, N.J., assignors to Princeton Chemical Research, Inc., Princeton, N.J., a corporation
No Drawing. Continuation of application Ser. No. 432,006, Feb. 11, 1965. This application Jan. 26, 1969, Ser. No. 805,078
Int. Cl. B44d 5/06; C09j 7/02
U.S. Cl. 117—122
8 Claims

ABSTRACT OF THE DISCLOSURE

Method of forming indicia on shaped articles of polybutene-1 which includes incorporating in the shaped article about 15 to 50 parts per hundred parts of polymer, of an inorganic filler, forming the article to be imprinted, and subjecting the article to a strain sufficient to opacify the shaped article at the point of strain.

This application is a continuation of application Ser. No. 432,006, filed Feb. 11, 1965, and now abandoned.

This invention relates to novel printing methods and compositions in the form of film or sheets which, upon being embossed, provide areas of visible color contrast as well as physical contrast. This invention also relates to compositions comprising substantially isotatic polybutene-1 containing filler and, optionally, a colorant.

It has been discovered recently that unpigmented polybutene-1 may be opacified when stretched under proper conditions. These properties, however, are not obtained with polyethylene or polypropylene. These opaque films may be selectively clarified by the application of pressure or heat, as employed in standard raised-type printing operations or heat-copying processes. The selectively clarified areas obtained by these methods stand out with great contrast compared to the opaque, unclarified background.

In attempting to transfer indicia to substantially clear polybutene-1 films by selectively opacifying certain areas of the film, as distinguished from clarifying opacified film, it has been discovered that a certain degree of strain is required to cause this transformation, viz. 10–25 percent, which is difficult and impractical to achieve with commercial printing and embossing equipment.

It has also been noted that, upon embossing some polymer films, the raised distinct areas disappear when the embossed polymer is warmed to about 140° F. This temperature also tends to distort and shrink the polymer.

A primary object of this invention therefore is to provide a method of opacifying polybutene-1 films by a comparatively low degree of strain.

Another object of this invention is to provide polybutene-1 polymers which can be embossed to yield opaque figures or other indicia which appear in physical and visible contrast to a transparent or otherwise unaffected background.

It is another object of this invention to provide a polybutene-1 polymer that, upon being embossed, will retain its opacity in the embossed area at temperatures above 140° F.

It is a further object of this invention to provide polybutene-1 compositions in the form of sheets, tapes or films which can be embossed to yield white or light-colored opaque figures, or letters, which appear in contrast to either a colored or dark background.

These and other objects of the invention have been achieved by incorporating inorganic fillers in poly butene-1 for the purpose of lowering the degree of strain required to exceed the yield point, thus permitting printing or decoration of the compounded polymer by embossing to yield white or light-colored figures.

Yield point is the elastic limit and is defined as the tensile stress at which the polymer will no longer recover to its original dimensions if the stress is relieved. The degree of strain required to exceed the yield point is the percent elongation required to exceed the yield point.

Color contrast of the embossed characters or figures can be enhanced by the incorporation of small quantities of dyes or pigments in the filled polybutene-1. The polybutene-1 polymers, useful in this invention, contain over 80 percent isotactic polymer, and preferably 85–95 percent isotactic polymer, as measured by diethyl ether extraction. The polymer should have a melt index between 0.1 and 20, and preferably between 0.5 and 15, as measured according to the American Society of Testing Materials procedure ASTM D–1238–57 (230° C., 2 160 g.). Polymers containing less than 80 percent isotactic materials show a reduced tendency to "blush" when strained. Filled polymers having a melt index lower than 0.1 are difficult to process, and materials with melt indices over 20 tend to be brittle when filled.

The compositions may be prepared by known techniques of mixing, using such equipment as 2-roll mills, Banbury mixers, twin-screw or compounding extruders, or the like. The embossing compositions may be prepared as sheets or films by calendering or flat die extrusion after which they may be slit into tape if desired.

After extrusion or calendering to yield film or sheeting, the material must be aged at least 3 days before optimum printability or color contrast is obtained upon embossing. This is approximately the time required for conversion of the Form II metastable crystalline state of polybutene—which is the form obtained on cooling from the melt—to the stable crystalline Form I. Although applicants do not wish to be limited by any theory, it is believed that the blushing effect is a characteristic of polybutene-1 in the Form I crystalline state, and does not occur with polybutene-1 in the Form II or metastable crystalline form.

Isotactic polybutene-1 is unique among the polyolefins in that it exists in at least three polymorphic forms. Upon quenching the polymer from the melt, a crystalline form of the polymer, commonly referred to as Form II polybutene-1, is obtained. Form II polybutene is well characterized by its IR spectra, DTA curves, and specific volume—temperature relationship, and other parameters, and has been described as a tetragonal crystalline form. At room temperature, Form II polybutene spontaneously converts to a stable crystalline form referred to as Form I polybutene-1. The rate of conversion of Form II polymer to Form I varies somewhat with the purity of the polymer, as measured by the ash content, and molecular weight. The conversion is usually essentially complete after 3–8 days at room temperature. The application of stress or pressure to Form II polybutene also results in its conversion to Form I polymer. Form I ponlybutene-1 has been described as a rhombic crystalline form and is well charaterized by its distinctive infrared spectrum, density, DTA curve, mechanical properties, and the like.

Suitable inert fillers for the embossing compositions include the various types of silica, calcium carbonate, talc, aluminum silicates, asbestos, mica, calcium silicate, barium sulfate, litharge, barium carbonate, aluminum carbonate, magnesium carbonate, alumina, or any mixtures of these materials.

The quantity of fillers used is selected according to the reinforcing action of the particular filler and may range from 15–50, and preferably 20–40 phr., where the expression "phr." will mean parts by weight per hundred parts by weight of resin. An aluminum silicate, designated ASP 403, produced by Minerals and Chemicals Phillip Corporation, shows high reinforcing action, and incorporation of 25 phr. of this material is sufficient to render good color contrast upon embossing. Calcium carbonate, which shows low reinforcing action is required at a level of 35–40 phr., to give comparable results.

Reinforcing action refers to a stiffening effect of the filler upon the composition, i.e., an increase in tensile and flexural modulus, and is accompanied by a decrease in the degree of strain or percent elongation required to exceed the yield point. A relatively small amount of a filler which shows high reinforcing action needs to be incorporated in polybutene-1 to reduce the strain required to exceed the yield point to 5 percent or less, whereas more of a filler which has less of a tendency to stiffen will be required to obtain comparable results.

Suitable dyes and pigments include: paratoner red, quinacridone red, benzidine yellow, phthalocyanine blue, phthalocyanine green, carbon black, bone black, nickel-azoyellow, azilarin maroon, thioindigogoid, indanthrone blue and Helio-Bordeaux maroon. The quantity of the dye or pigment incorporated in the formulation should be sufficient to uniformly color the filled polymer without interfering with the color contrast obtained upon embossing. The quantity of the dye or pigment should be less than 1 phr. of the polymer used, and preferably between 0.01 and 0.1 phr., where phr. means part by weight of additive per 100 parts by weight of resin.

The filled polybutene-1 compositions show increased temperature resistance of the embossed area over presently used materials based on PVC. For example, color contrast of the embossed area in the PVC based materials disappears when warmed to about 140° F., and distortion and shrinkage of the embossed figures occurs. Color contrast of the embossed area in polybutene-1 compositions is stable at temperatures up to about 185° F., and no distortion or shrinkage of the embossed figures takes place.

Pressure-sensitive adhesive materials with a release backing may be applied to one surface of the embossing composition, enabling easy use as labels. Suitable pressure sensitive adhesive materials include: SR–585 silicone type, manufactured by General Electric; Shawinigan D–263; an acrylic copolymer Latex and Shawningan D–267, a vinyl acetate copolymer Latex, both manufactured by the Shawinigan division of Monsanto Chemical Corporation; natural rubber and nitrile rubber formulations incorporating tackifiers; Vistanex types based on polyisobutylene; and formulations of various resins such as ethylene-vinyl acetate copolymers and polybutene-1 formulated with tackifying plasticizers.

The following non-limiting examples are given as certain embodiments and illustrations of the invention, and are not to be construed as narrowing the novel and inventive method and article of manufacture of applicants.

EXAMPLE I

Polybutene-1 (100 parts) having a melt index of 2.2 (ASTM D–1238–57) and 93 percent diethyl ether insolubility is mixed with 35 parts of powdered mica and 0.1 part of X2303 Monarch Blue toner (phthalocyanine blue) on a 2-roll mill at 240° F. The milled sheet is diced and the compound extruded at a die temperature of 340° F. into a film 0.007 inch thick. The color of the film is deep blue. The film is slit into strips ⅜ inch wide and is allowed to age 4 days at room temperature. A strip of the material is loaded into an embossing punch manufactured by Tapeprinter, Inc., fitted with a rotating die. The cavities of the embossing die are approximately 1 mm. in depth and the raised area of the punches approximately 1 mm. in height. The polybutene-1 composition is embossed, providing white to light blue letters and numbers, which appear in contrast to the deep blue color of the unstrained areas.

A sample of the printed tape is placed in a circulating air oven at 180° F. for 12 hours. No decrease in color contrast of the printed figures occurs.

EXAMPLE II

Example I is repeated using 20 phr. of ASP–403 aluminum silicate and 0.1 part of A4433 Green toner (phthalocyanine green). A deep green colored film is obtained, having printing characteristics equal to those obtained in Example I.

EXAMPLE III

Polybutene-1 having a melt index of 3.0 and 91 percent diethyl ether insolubility is compounded in the manner of Example I with 30 phr. of Hi-Sil 233, a powdered silica and 0.5 part of Monarch–74 carbon black. After extrusion at 350° F. to yield a black film, 0.006 inch thick, the film is coated with an adhesive having the following composition:

| | Parts |
|---|---|
| Elvax 150 (Du Pont) (ethylene-vinyl acetate copolymer) | 30 |
| Arochlor 5460 (Monsanto) (chlorinated polyphenyl) | 54 |
| Arochlor 1254 (Monsanto) (chlorinated polyphenyl) | 25 |
| Xylene | 68 |

The xylene is evaporated at an elevated temperature, and the adhesive surface covered with a silicone-treated release paper. The laminated film is slit into strips ⅜ inch wide and allowed to age 3 days. A strip is loaded into the embossing device of Example I and printed to yield white figures contrasted against a black background. The release backing is stripped off, and the printed tape applied to surfaces as labeles.

EXAMPLE IV

Polybutene-1 (100 parts) having a melt index of 5.3 and 89 percent diethyl ether insolubility is compounded in the manner of Example I with 40 phr. of talc and 0.2 part of A1757 para toner (p-toluidene red). After extrusion, aging and embossing, a tape having white figures contrasted against a red background is obtained.

EXAMPLE V

Example IV is repeated using 100 parts of polybutene-1 and 35 phr. of powdered Mica. No dye or pigment is used. After extrusion, slitting, aging and printing, a tape having opaque white figures contrasted to a transparent to translucent background is obtained.

Thus, in accord with the invention, it has been discovered that polybutene-1 polymers will turn opaque when stretched, and further, this opacity can be achieved at lower strain points by incorporating a filler in the polymer in the amounts described herein. Film manufactured from this composition, may be used in commercial embossing machines for the manufacture of raised opaque indicia having excellent physical contrast and visible color contrast to the background area of the film. Furthermore, films embossed in such a manner are heat-stable at higher temperatures than previously used compositions.

Although the invention has been disclosed and described with reference to certain preferred embodiments, it is not the applicants' intention to be limited thereby, and certain obvious modifications of the composition of matter, process and article of manufacture are intended to be included within the broad scope of the invention.

We claim:

1. A shaped article consisting essentially of rhombic, crystalline, isotactic polybutene-1, which polybutene-1 is at least 80% insoluble in diethyl ether and has a melt index of about 0.1 to 20, and at least one inorganic filler therein, which article has been stretched in predetermined areas thereof to an extent sufficient to exceed the yield point of said article in said areas thereby imparting a visible color contrast to said stretched areas wherein said inorganic filler is present in a proportion sufficient to produce the degree of strain required to impart said visible color contrast in said predetermined areas of said article by said stretching.

2. A shaped article as claimed in claim 1, which is a film.

3. A shaped article as claimed in claim 2, wherein said filler is present in a proportion of about 15 to 50 parts per hundred parts of polybutene-1.

4. A shaped article as claimed in claim 2, wherein said filler is at least one member selected from the group consisting of silica, calcium carbonate, talc, aluminum silicate, asbestos, mica, calcium silicate, magnesium silicate, barium sulfate, litharge, barium carbonate, aluminum carbonate, magnesium carbonate, and alumina.

5. A shaped article as claimed in claim 2, including up to about 1% by weight of a colorant.

6. A shaped article as claimed in claim 2, wherein said film is about 0.5 to 35 mils thick.

7. A shaped article as claimed in claim 2, wherein said shaped article has been permitted to age for about 3 to 8 days at about room temperature between the formation thereof and the subjection thereof to said strain.

8. A shaped article as claimed in claim 2, having a pressure-sensitive adhesive coated on at least one side thereof.

References Cited
UNITED STATES PATENTS

| | | | |
|---|---|---|---|
| 2,925,625 | 2/1960 | Souza | 264—320X |
| 2,996,822 | 7/1961 | Souza | 264—293X |
| 3,022,541 | 2/1962 | Passley et al. | 264—293X |
| 3,144,430 | 7/1964 | Schaffhausen | 117—122PF |
| 3,385,817 | 5/1968 | Jones | 260—41 |

WILLIAM D. MARTIN, Primary Examiner

J. E. MILLER, Jr., Assistant Examiner

U.S. Cl. X.R.

117—11, 138.8; 161—6; 260—41; 264—293, 320